US008779880B2

(12) United States Patent
Sullivan et al.

(10) Patent No.: US 8,779,880 B2
(45) Date of Patent: Jul. 15, 2014

(54) FLUID DEFLECTION TRANSFORMER TANK

(71) Applicant: ABB Technology AG, Zurich (CH)

(72) Inventors: Elizabeth D. Sullivan, Danville, VA (US); David B. Elzey, Danville, VA (US); Paul S. Lowry, South Boston, VA (US)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 13/743,365

(22) Filed: Jan. 17, 2013

(65) Prior Publication Data

US 2013/0187739 A1 Jul. 25, 2013

Related U.S. Application Data

(60) Provisional application No. 61/589,415, filed on Jan. 23, 2012.

(51) Int. Cl.
H01F 27/02 (2006.01)
H01F 27/26 (2006.01)

(52) U.S. Cl.
USPC ............... 336/90; 336/55; 336/94; 336/96; 336/210

(58) Field of Classification Search
CPC ..... H01F 27/02; H01F 27/027; H01F 27/292; H01F 37/00; H01F 2017/048; H01F 27/06; H01F 27/263; H01F 27/266; H01F 27/306
USPC ......... 336/90, 210, 55, 56, 57, 58, 59, 60, 61, 336/94, 96
See application file for complete search history.

(56) References Cited

U.S. PATENT DOCUMENTS

| 3,506,064 | A | * | 4/1970 | Appleyard et al. | ....... 165/104.33 |
| 3,545,538 | A | * | 12/1970 | Wilson et al. | ................. 165/175 |
| 4,453,197 | A | * | 6/1984 | Burrage | ......................... 361/272 |
| 4,939,833 | A | * | 7/1990 | Thomas | ......................... 220/565 |

(Continued)

FOREIGN PATENT DOCUMENTS

| CN | 202013795 U | 10/2011 |
| DE | 20022325 U1 | 8/2001 |
| EP | 0077575 A1 | 4/1983 |

OTHER PUBLICATIONS

PCT Search Report in PCT/US2013/021789 dated Jun. 28, 2013.

(Continued)

Primary Examiner — Alexander Talpalatski
Assistant Examiner — Kazi Hossain
(74) Attorney, Agent, or Firm — Manelli Selter PLLC; Edward J. Stemberger

(57) ABSTRACT

A transformer includes an enclosed tank having an interior and an enclosed radiator spaced from the tank and in fluid communication with the interior. The radiator includes two panels joined to define a substantially enclosed space. The panels have opposing faces and bottom ends. The bottom ends of the panels are joined together by a first weld and portions of the opposing faces of the panels are joined together by a plurality of second welds. The first weld and the plurality of second welds are constructed and arranged such that when an over-pressure condition occurs in the tank and thus in the radiator, the second welds will break generally uniformly permitting the panels to balloon generally uniformly, directing a rupture of the radiator to occur at the first weld, without any rupture of the tank occurring.

20 Claims, 6 Drawing Sheets

(56) References Cited

U.S. PATENT DOCUMENTS

| | | | |
|---|---|---|---|
| 8,284,006 B2* | 10/2012 | Bacarisse | 336/90 |
| 2009/0302094 A1* | 12/2009 | Milam | 228/196 |
| 2010/0065261 A1 | 3/2010 | Pintgen et al. | |
| 2010/0065306 A1 | 3/2010 | Pintgen et al. | |
| 2010/0133284 A1* | 6/2010 | Green et al. | 220/721 |

OTHER PUBLICATIONS

PCT Search Report & Written Opinion in PCT/US13/21789 dated Sep. 26, 2013.

* cited by examiner

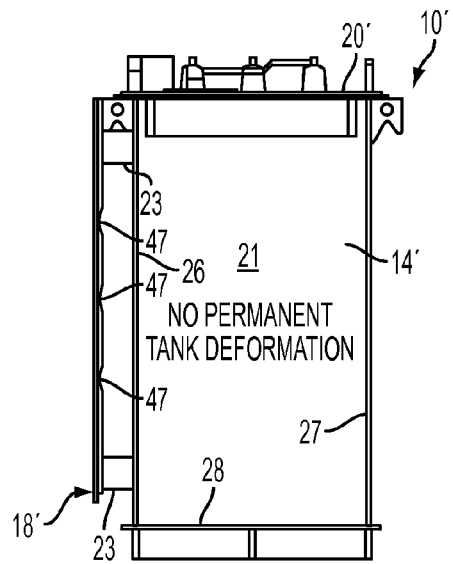 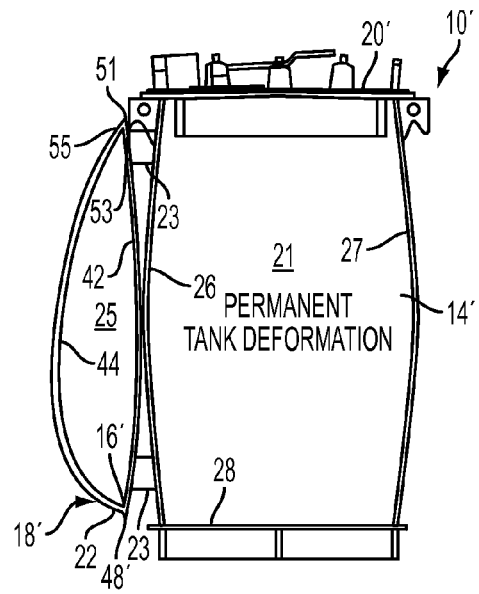
FIG. 3A  FIG. 3B
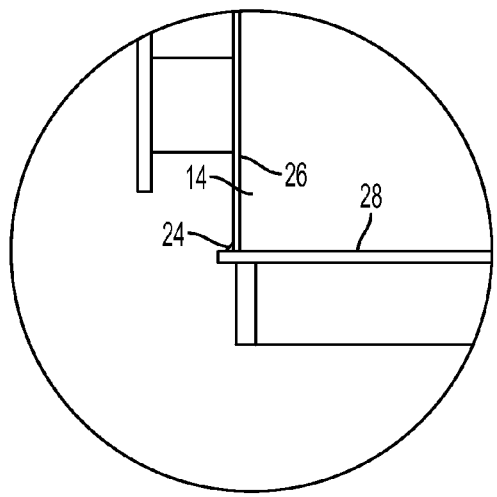 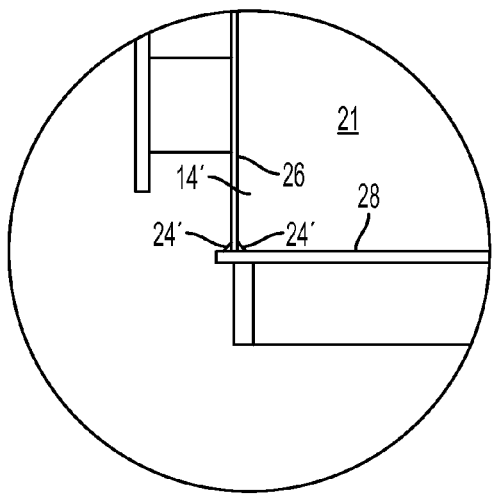
FIG. 4A
PRIOR ART
FIG. 4B

FLUID DEFLECTION TRANSFORMER TANK

FIELD

The invention relates to transformers and, more particularly, to failure of liquid-filled transformer tanks in emergency overload situations.

BACKGROUND

With reference to FIG. 1, a conventional network transformer, generally indicated at 10, is located under grates 12 in large metropolitan areas. These transformers 10 are subject electrical overloading as well as corrosion from water contacting tank enclosures. FIG. 2A shows the conventional transformer under normal service conditions, with no permanent deformation. As shown in FIG. 2B, during over-pressurization or overload service conditions, the tank 14 of the transformer 10 can experience permanent deformation and can rupture at potential rupture points 16 in a radiator 18 or in the cover 20. If the rupture occurs at the region of the cover 20, unsafe conditions could occur above the transformer 10 on busy city streets.

Thus, there is a need to provide a transformer that is configured to rupture uniformly out of the bottom of a radiator thereof during an emergency to mitigate damage in the street above.

SUMMARY

An object of the invention is to fulfill the need referred to above. In accordance with the principles of the present invention, this objective is achieved by providing a transformer that includes an enclosed tank having an interior and an enclosed radiator spaced from the tank and in fluid communication with the interior. The radiator includes two panels joined together to define a substantially enclosed space. The panels have opposing faces and bottom ends. The bottom ends of the panels are joined together by a first weld and portions of the opposing faces of the panels are joined together by a plurality of second welds. The first weld and the plurality of second welds are constructed and arranged such that when an overpressure condition occurs in the tank and thus in the radiator, the second welds will break generally uniformly permitting the panels to balloon generally uniformly, directing a rupture of the radiator to occur at the first weld, without any rupture of the tank occurring.

In accordance with another aspect of an embodiment, a method of controlling rupture of a transformer during overpressure conditions is provided. The transformer has an enclosed tank having an interior and an enclosed radiator spaced from the tank and in fluid communication with the interior. The radiator comprises two panels joined together to define a substantially enclosed space. The panels have opposing faces and bottom ends. The method joins the bottom ends of the panels together by a first weld. Portions of the opposing faces of the panels are joined together by a plurality of second welds. The method ensures that when an over-pressure condition occurs in the tank and thus in the radiator, the second welds will break generally uniformly permitting the panels to balloon generally uniformly, directing a rupture of the radiator to occur at the first weld, without any rupture of the tank occurring.

In accordance with yet another aspect of an embodiment, a radiator of a transformer includes a pair of panels joined together to define a substantially enclosed space. The panels have opposing faces and bottom ends. A first weld joins the bottom ends of the panels together. A plurality of second welds joins portions of the opposing faces of the panels together. The first weld and the plurality of second welds are constructed and arranged such that when an overpressure condition occurs in the radiator, the second welds will break generally uniformly permitting the panels to balloon generally uniformly, directing a rupture of the radiator to occur only at the first weld.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings wherein like numbers indicate like parts, in which:

FIG. 3A is view of a transformer, provided in accordance with an embodiment, shown under normal service conditions, with no permanent tank deformation.

FIG. 3B is view of the transformer of FIG. 3A under overload service conditions, with permanent tank deformation and showing a potential rupture point.

FIG. 4A is an enlarged view of a base weld on the conventional transformer of FIG. 2A.

FIG. 4B is an enlarged view of a base weld on the transformer of the embodiment FIG. 3A.

DETAILED DESCRIPTION OF THE EXEMPLARY EMBODIMENTS

Figure 1:
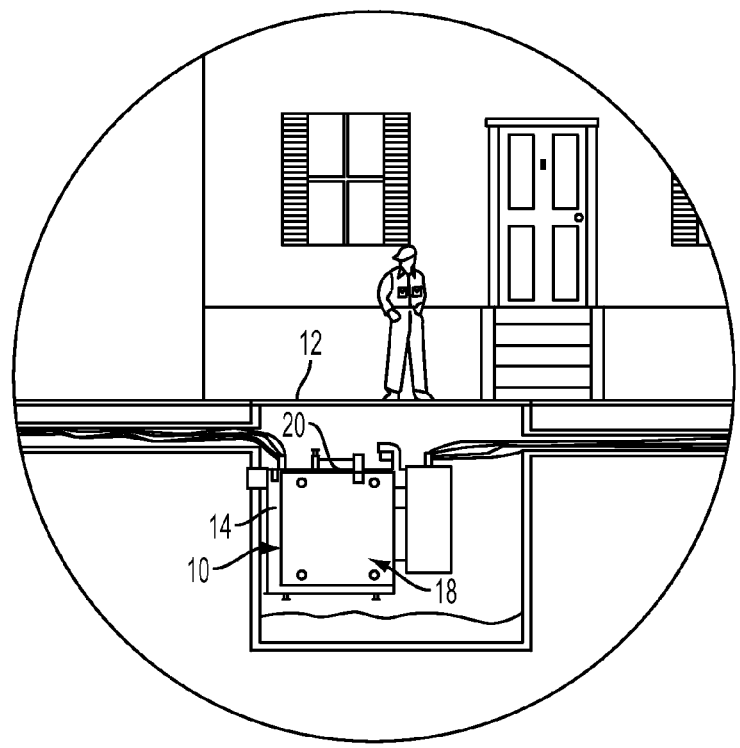
FIG. 1 is a view of a conventional transformer in service in a large metropolitan area.

With reference to FIG. 3A, a liquid-filled transformer 10' of the embodiment includes an enclosed, generally box-shaped tank 14' and a radiator 18' spaced from the tank 14' and in fluid communication with an interior 21 of the tank 14' via conduits 23. The radiator 18' comprises two panels 42, 44 joined to define a substantially enclosed space 25 (FIG. 3B). FIG. 3A shows the transformer 10' under normal service conditions with no permanent tank deformations. The interior 21 houses a component (not shown) such as a transformer coil and core assembly and contains oil.

FIG. 3B shows the tank 14' and a radiator 18' under overload service conditions with permanent deformation. The overload service condition can occur when the component in the tank 14' is under a fault condition, which increases pressure in the tank 14' and enclosed radiator 18'. Potential rupture points 16' are shown near a bottom portion 22 of the radiator 18' of the transformer 10'. Thus, as shown FIG. 10, if the radiator 18' ruptures, hot oil spillage occurs uniformly out of the bottom portion 22 thereof during an emergency, thereby mitigating damage in the street above the transformer 10'.

In order to ensure that the tank 14' withstands greater forces so as to control rupture though the bottom portion 22 of the radiator 18', modifications to the conventional tank 14 have been made. FIG. 4A shows a conventional weld 24 connecting a side panel 26 to a bottom panel 28 of the tank 14. The weld 24 is on the outside of the tank 14. In accordance with the embodiment of the tank 14' and as shown in FIG. 4B, the weld 24' is provided between each side panel 26 and the bottom panel 28 on both the inside and outside of the tank 14'. Thus the dual weld 24' will ensure that the tank 14' holds more pressure as compared to tank 14.

Figure 2A:
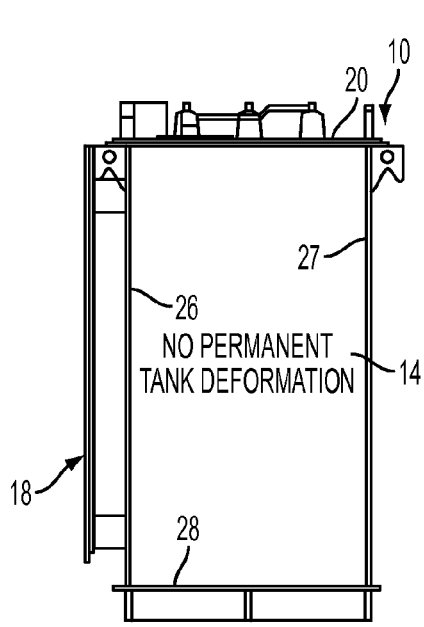
FIG. 2A is view of a conventional transformer shown under normal service conditions and with no permanent tank deformation.
Figure 2B:
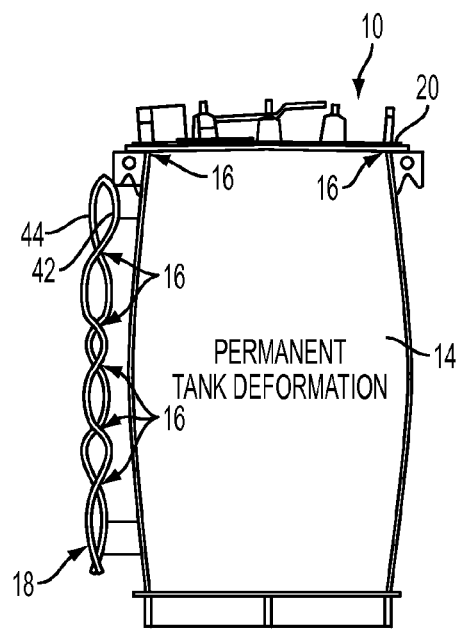
FIG. 2B is view of the conventional transformer of FIG. 2A shown under overload service conditions and with permanent tank deformation and potential rupture points.
Figure 5A:
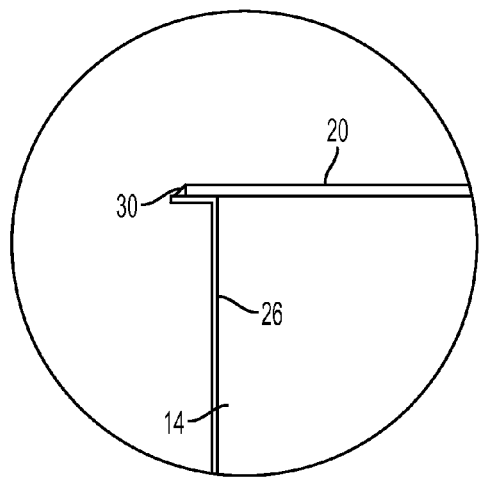
FIG. 5A is an enlarged view of cover bracing for the conventional transformer of FIG. 2A.
Figure 5B:
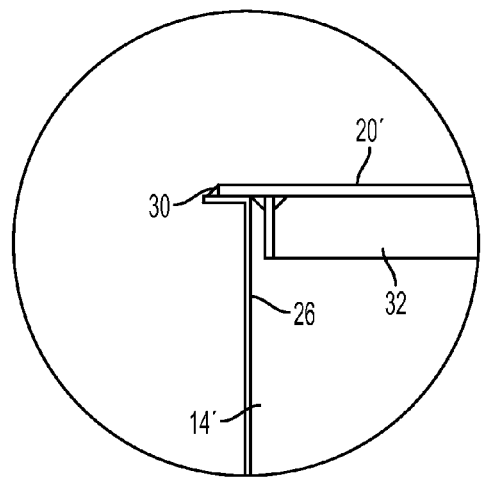
FIG. 5B is an enlarged view of cover bracing for the transformer of the embodiment FIG. 3A.

With reference to FIGS. 2A and 5A, the conventional cover 20 is coupled to the side panels 26 and 27 via a weld 30. With reference to FIG. 5B, in accordance with the embodiment, to stiffen the cover 20', brace 32 is welded to the underside (inside portion) of the cover 20' In addition, the thickness of the cover 20' can be increased as compared to cover 20.

Figure 6A:
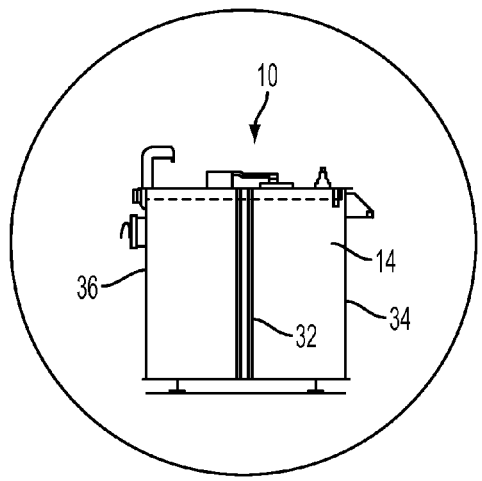
FIG. 6A is an enlarged view of tank bracing for the conventional transformer of FIG. 2A.
Figure 6B:
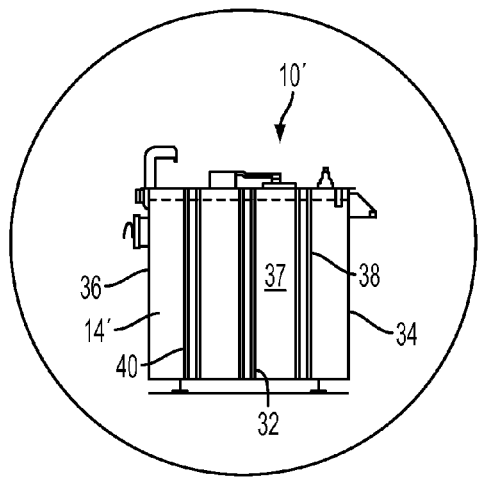
FIG. 6B is an enlarged view of tank bracing for the transformer of the embodiment FIG. 3A.

Conventional tank bracing is shown in FIG. 6A that includes a brace 34 disposed generally centrally between the two side panels 34, 36 of the tank 14. In accordance with the embodiment and with reference to FIG. 6B, in tank 14' an additional brace 38 is coupled to a side panel 37 generally centrally between brace 32 and side panel 34 and an additional brace 40 is coupled to side panel 37 generally centrally between brace 32 and side panel 36 so as to stiffen the tank sides. Similar bracing is provided on the side panel that opposes side panel 37.

Figure 7A:
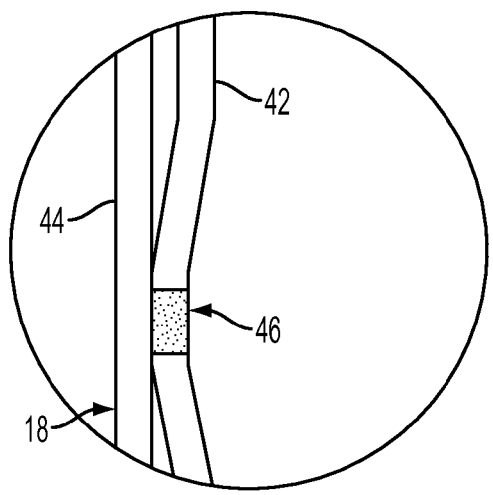
FIG. 7A is a view of a weld-filled hole joining cooler panels of the radiator of the conventional transformer of FIG. 2A.
Figure 7B:
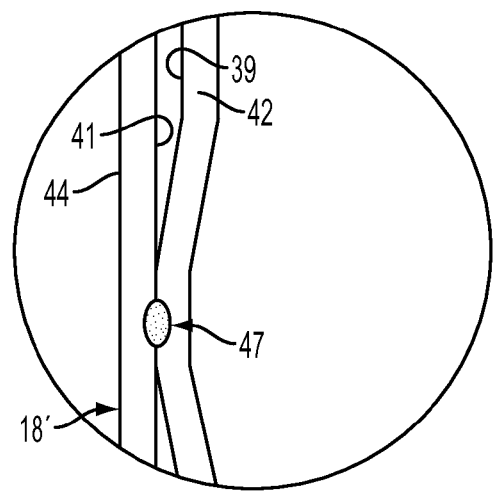
FIG. 7B is a view of a resistance weld nugget joining cooler panels of the radiator of the transformer of FIG. 3A.
Figure 8A:
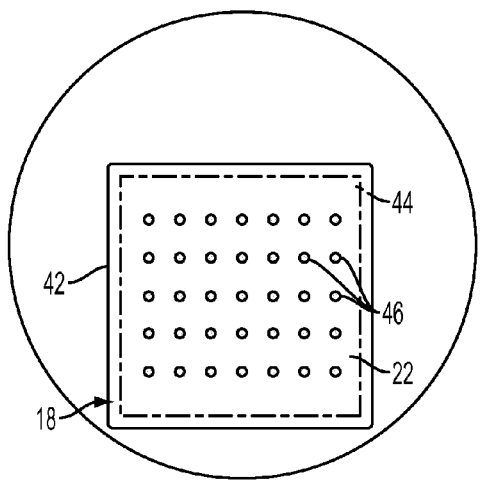
FIG. 8A is a view of a typical weld-filled hole pattern joining the cooler panels of the radiator of the conventional transformer of FIG. 2A.
Figure 8B:
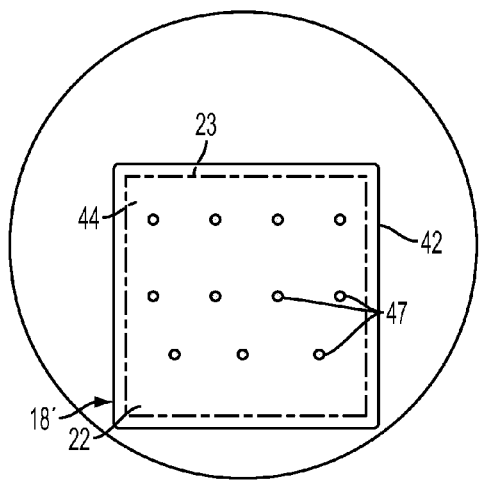
FIG. 8B is a view of a typical weld nugget pattern joining the cooler panels of the radiator of the transformer of FIG. 3A.

In order to ensure that the radiator 18' ruptures uniformly at the bottom portion 22 of the radiator 18', modifications to the radiator 18 of the conventional transformer 10 have been made. With reference to FIG. 7A, the cooler panels 42 and 44 that define the conventional radiator 18 are typically joined together by a plurality of weld-filled holes 46. A conventional pattern of the weld-filled holes 46 is shown in FIG. 8A. In accordance with the embodiment and with reference to FIG. 7B instead of using the weld-filled holes 46, a plurality of resistance welds 47 joins portions of opposing planar faces 39 and 41 of the cooler panels 42 and 44, respectively. FIG. 8B shows the pattern of welds 47 on faces 39 and 41 of the embodiment, which includes less welds than in the conventional pattern of FIG. 8A. In the embodiment, there are fewer welds 47 at the bottom portion 22 than at the top portion 23 of the radiator 18'.

Figure 9A:
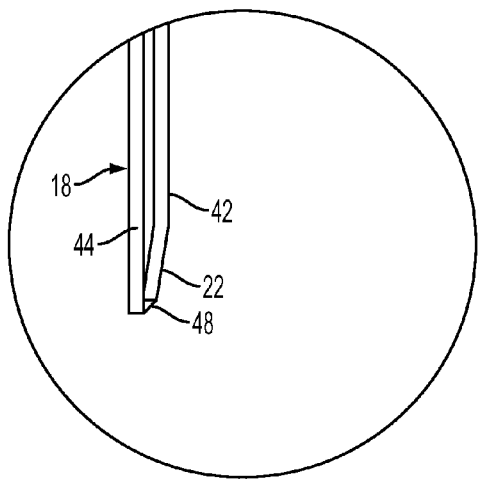
FIG. 9A is an enlarged view of a bottom panel weld on the conventional transformer of FIG. 2A.
Figure 9B:
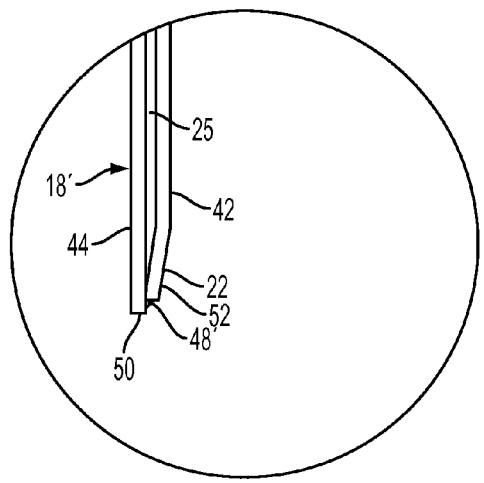
FIG. 9B is an enlarged view of a bottom panel weld on the transformer of the embodiment FIG. 3A.
Figure 10:
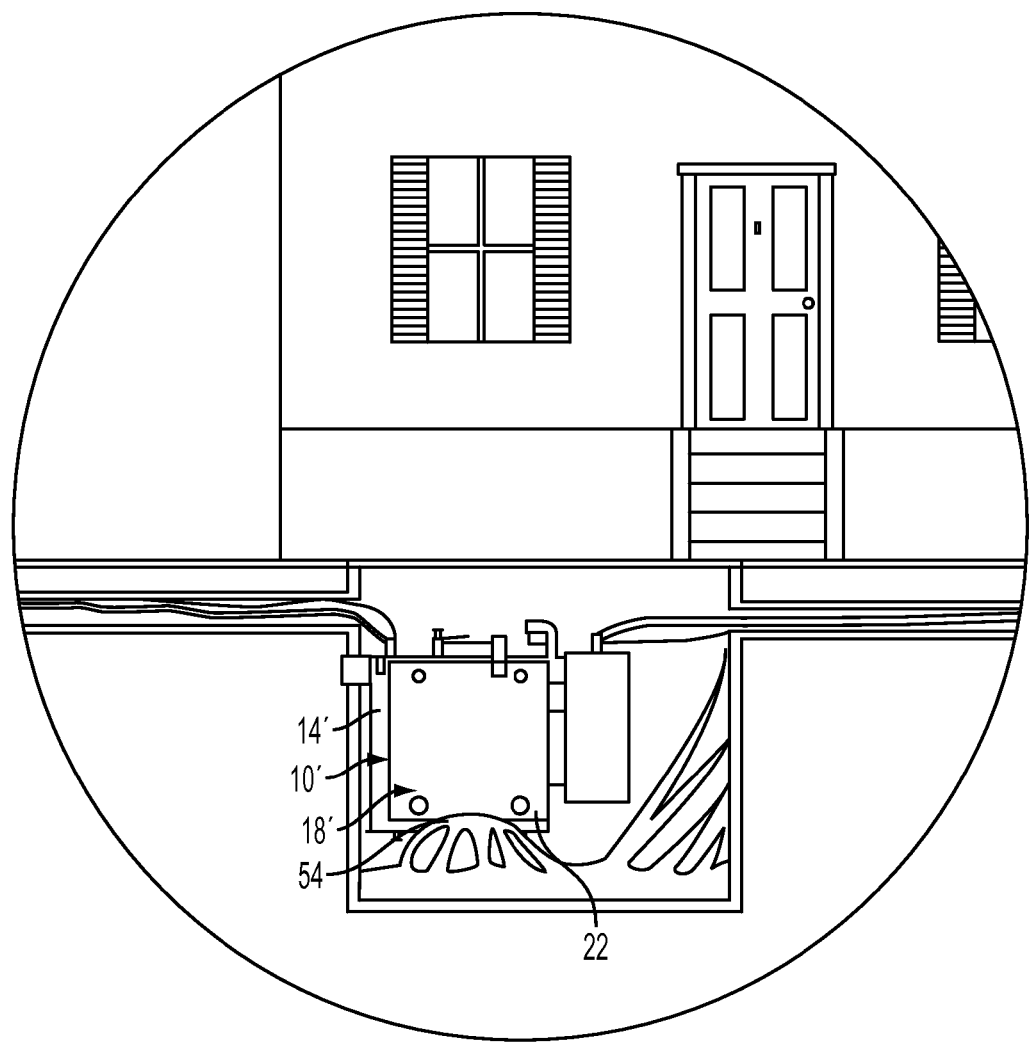
FIG. 10 is a view of the transformer of an embodiment under directional transformer service conditions in a large metropolitan area.

Finally, as shown in FIG. 9B, a weaker weld 48', as compared to the conventional weld 48 of FIG. 9A, and the weld 51 of the top ends 53, 55 of the cooler panels 42 and 44 (as seen in FIG. 3B), joins the bottom ends 50, 52 of the cooler panels 42 and 44. In the embodiment, the weld 48' is a continuous bead of about ⅛" in thickness along the bottom ends of the panels 42, 44. Thus, the welds 47, 48' and the weld pattern are constructed and arranged to ensure that the welds 47 will break uniformly due to an over-pressure emergency in the tank 14 and radiator 18' without rupturing cooler panels 42 and 44. The pressure increase in the radiator 18' causes the cooler panels 42, 44 to balloon or deform uniformly (see FIG. 3B) increasing the space 25, directing any rupture to occur only at the weld 48' at the bottom portion 22 of the radiator 18', with no rupture occurring in the strengthened tank 14'. Thus, as shown in FIG. 10, upon rupture, hot oil 54 is directed out the bottom portion 22 of the radiator 18'.

Sacrificial anodes can be added to the steel tank 14' and radiator 18' to lessen corrosion. In addition, the tank 14' and radiator 18' can be built from 304L or 316L stainless steel.

Thus, by increasing the strength of the tank 14' and configuring the radiator 18' to rupture only at the bottom portion 22 thereof, the ruptured transformer 10' will not cause significant property damage to the above a street in a metropolitan area or harm to city inhabitants.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A transformer comprising:
an enclosed tank having an interior, and
a radiator spaced from the tank and in fluid communication with the interior, the radiator comprising two panels joined to define a substantially enclosed space, the panels having opposing faces and bottom ends, the bottom ends of the panels being joined together by a first weld and portions of the opposing faces of the panels being joined together by a plurality of second welds,
wherein the first weld and the plurality of second welds are constructed and arranged such that when an overpressure condition occurs in the tank and thus in the radiator, the second welds will break generally uniformly permitting the panels to balloon generally uniformly, directing a rupture of the radiator to occur at the first weld, without any rupture of the tank occurring.

2. The transformer of claim 1, wherein each of the second welds is a resistance weld.

3. The transformer of claim 2, wherein an amount of the second welds near the bottom ends of the panels is less than an amount of the second welds near top ends of the panels.

4. The transformer of claim 1, wherein the first weld is a continuous bead of about ⅛" in thickness along the bottom ends of the panels.

5. The transformer of claim 1, wherein the tank includes side panels, a cover and a bottom panel.

6. The transformer of claim 5, wherein the side panels are coupled to the bottom panel by a weld on both an inside of the tank and on an outside of the tank.

7. The transformer of claim 5, further comprising a brace coupled to the cover and disposed in the interior of the tank.

8. The transformer of claim 5, further comprising a plurality of braces coupled to opposing side panels.

9. A method of controlling rupture of a transformer during over-pressure conditions, the transformer having an enclosed tank having an interior, and an enclosed radiator spaced from the tank and in fluid communication with the interior, the radiator comprising two panels joined to define a substantially enclosed space, the panels having opposing faces and top and bottom ends, the method comprising:

joining the bottom ends of the panels together by a first weld, joining portions of the opposing faces of the panels together by a plurality of second welds, and ensuring that when an over-pressure condition occurs in the tank and thus in the radiator, the second welds will break generally uniformly permitting the panels to balloon generally uniformly, directing a rupture of the radiator to occur at the first weld, without any rupture of the tank occurring.

10. The method of claim 9, wherein the step of joining the opposing faces includes using resistance welds as the second welds.

11. The method of claim 10, wherein an amount of the second welds near the bottom ends of the panels is less than an amount of the second welds near top ends of the panels.

12. The method of claim 9, wherein the step of joining the bottom ends includes providing the first weld as a continuous bead of about 1/8" in thickness along the bottom ends of the panels.

13. The method of claim 9, wherein the tank includes side panels, a cover and a bottom panel, and the method further comprises coupling the side panels to the bottom panel by a weld on both an inside of the tank and on an outside of the tank.

14. The method of claim 13, further comprising coupling a brace to the cover so as to be disposed in the interior of the tank.

15. The method of claim 13, further comprising coupling a plurality of braces to opposing side panels.

16. A radiator of a transformer, the radiator comprising:

a pair of panels joined together to define a substantially enclosed space, the panels having opposing faces and bottom ends, a first weld joining the bottom ends of the panels together, and a plurality of second welds joining portions of the opposing faces of the panels together, wherein the first weld and the plurality of second welds are constructed and arranged such that when an overpressure condition occurs in the radiator, the second welds will break generally uniformly permitting the panels to balloon generally uniformly, directing a rupture of the radiator to occur only at the first weld.

17. The radiator of claim 16, wherein each of the second welds is a resistance weld.

18. The radiator of claim 17, wherein an amount of the second welds near the bottom ends of the panels is less than an amount of the second welds near top ends of the panels.

19. The radiator of claim 16, wherein the first weld is a continuous bead of about 1/8" in thickness along the bottom ends of the panels.

20. The radiator of claim 16, in combination with a transformer tank having an interior, the radiator being in fluid communication with the interior.

* * * * *